United States Patent
Bai et al.

(10) Patent No.: US 12,216,085 B2
(45) Date of Patent: Feb. 4, 2025

(54) METHOD FOR EDDY CURRENT THERMOGRAPHY DEFECT RECONSTRUCTION BASED ON ELECTRICAL IMPEDANCE TOMOGRAPHY

(71) Applicant: University of Electronic Science and Technology of China, Sichuan (CN)

(72) Inventors: Libing Bai, Sichuan (CN); Xu Zhang, Sichuan (CN); Chao Ren, Sichuan (CN); Yiping Liang, Sichuan (CN); Ruiheng Zhang, Sichuan (CN); Yong Duan, Sichuan (CN); Jinliang Shao, Sichuan (CN); Yali Zheng, Sichuan (CN); Yuhua Cheng, Sichuan (CN)

(73) Assignee: UNIVERSITY OF ELECTRONIC SCIENCE AND TECHNOLOGY OF CHINA, Sichuan (CN)

( * ) Notice: Subject to any disclaimer, the term of this patent is extended or adjusted under 35 U.S.C. 154(b) by 327 days.

(21) Appl. No.: 17/897,248

(22) Filed: Aug. 29, 2022

(65) Prior Publication Data
US 2022/0412919 A1    Dec. 29, 2022

(51) Int. Cl.
*G01N 27/90* (2021.01)
*G01N 1/44* (2006.01)
*G01N 25/72* (2006.01)

(52) U.S. Cl.
CPC ........... *G01N 27/9006* (2013.01); *G01N 1/44* (2013.01); *G01N 25/72* (2013.01); *G01N 27/90* (2013.01); *G01N 27/9046* (2013.01)

(58) Field of Classification Search
USPC .......................................................... 702/38
See application file for complete search history.

(56) References Cited

U.S. PATENT DOCUMENTS

| | | | |
|---|---|---|---|
| 10,229,486 B2 | 3/2019 | Gao et al. | |
| 11,036,978 B2 | 6/2021 | Yin et al. | |
| 11,486,858 B2 * | 11/2022 | Li | G01N 27/82 |
| 2004/0120383 A1 * | 6/2004 | Kennedy | G01N 25/72 374/57 |
| 2007/0140546 A1 * | 6/2007 | Suh | G01N 27/9046 382/141 |
| 2013/0077650 A1 * | 3/2013 | Traxler | G01N 25/72 374/5 |
| 2019/0228517 A1 * | 7/2019 | Cheng | G06V 10/763 |

\* cited by examiner

*Primary Examiner* — Paul D Lee
(74) *Attorney, Agent, or Firm* — Yue (Robert) Xu; Apex Attorneys at Law, LLP (57) ABSTRACT

The present invention provides a method for eddy current thermography defect reconstruction based on electrical impedance tomography, first, obtaining a thermal reference image of temperature change with time by acquiring a thermogram sequence S of the specimen in the process of heating and fitting a curve for pixels of each location of the thermogram sequence S, then, creating a current matrix and a magnetic potential matrix, and calculating the satisfied conductivity distribution through iterations, so as a reconstructed image is obtained, then taking the low conductivity area of the reconstructed image as the defect profile, thus the defect profile is identified and quantified.

1 Claim, 3 Drawing Sheets

METHOD FOR EDDY CURRENT THERMOGRAPHY DEFECT RECONSTRUCTION BASED ON ELECTRICAL IMPEDANCE TOMOGRAPHY

FIELD OF THE INVENTION

This application claims priority under the Paris Convention to Chinese Patent Application No. 202111004236.9, filed on Aug. 30, 2021, the entirety of which is hereby incorporated by reference for all purposes as if fully set forth herein.

The present invention relates to the field of defect testing, more particularly to a method for eddy current thermography defect reconstruction based on electrical impedance tomography.

BACKGROUND OF THE INVENTION

Due to having many advantages, such as non-contact, broad testing range and high testing efficiency, the method of eddy current thermography testing is widely used in the Non-Destructive Testing (NDT) field of metal material. Coil with high frequency alternating current can generate an electromagnetic (EM) field. When the electromagnetic field is applied to a conductive material, an induced eddy current will be generated. When a defect exists in the conductive material, eddy current (EC) will come together at the defect region, then a high temperature region will emerge. Recording the heating and cooling process of the surface of the conductive material by an infrared camera, a thermogram sequence of the high temperature region can be acquired, and through which the location of the defect can be detected.

However, the above-mentioned method in prior art can only detect (identify) the location of a defect, and can't quantify the profile of the defect. In the fields, such as aerospace, high-speed railway and building materials, the quantification of defect is of great significance, and can reduce the probability of disaster or accident.

The traditional method identifies a defect through its corresponding high temperature region in thermograms. When eddy current encounter a defect, it will move around the defect, and congregate at two ends of the defect, where a high temperature region is formed. So, in the process of heating, the temperatures of two ends of the defect increase more rapidly than other parts. In addition, in the process of cooling, the temperatures of two ends of the defect decrease more rapidly than other parts. Therefore, we can identify the location of a defect through the temperature change gradient. However, the high temperature only exists in the two ends of the defect, thus make it difficult to obtain the true profile of the defect.

SUMMARY OF THE INVENTION

The present invention aims to overcome the deficiencies of the prior art and provides a method for eddy current thermography defect reconstruction based on electrical impedance tomography, which reconstructs a conductivity distribution from an acquired thermogram sequence. For the reason that the conductivity of the defect region is far smaller than that of non-defect region, the true profile of the defect can be identified according to the conductivity distribution.

To achieve these objectives, in accordance with the present invention, a method for eddy current thermography defect reconstruction based on electrical impedance tomography is provided, comprising:

(1): powering on a coil, and then using the coil to excite a specimen under test (hereinafter referred to as specimen), then an induced eddy current will be generated in the specimen, meanwhile, in the process of heating, using an infrared camera to acquire a thermogram sequence of the specimen, which is denoted by thermogram sequence S, where each frame of image of thermogram sequence S is m*n;

(2): for each location of thermogram sequence S, putting the pixels there together according to time to fit a temperature-time curve, then choosing the slope of the second point of the temperature-time curve as a rate of change of temperature with respect to time, which is denoted by $$\frac{\partial T_{ij}}{\partial t},$$

where $T_{ij}$ is the pixel value of at the second point, row i and column j represent its location, t is the time at the second point, then creating a thermal reference image by taking $$\frac{\partial T_{ij}}{\partial t}$$

as a pixel, where i=1, 2, ..., m, j=1, 2, ..., n;

(3): creating a current matrix 3.1) calculating a current amplitude for each pixel of the thermal reference image according to the following heat conduction equation:

$$\frac{\partial T_{ij}}{\partial t} = \frac{(J_{ij})^2}{\sigma^* \rho C}$$

where $J_{ij}$ is the current amplitude of row i and column j, i=1, 2, ..., m, j=1, 2, ..., n, $\sigma^*$ is the conductivity of the specimen, $\rho$ is the density of the specimen, C is the specific heat capacity of the specimen;

3.2): creating a current matrix J:

$$J = \begin{bmatrix} J_{11} & J_{12} & \cdots & J_{1n} \\ J_{21} & J_{22} & \cdots & J_{2n} \\ \vdots & \vdots & \vdots & \vdots \\ \vdots & \vdots & J_{ij} & \vdots \\ J_{m1} & J_{m2} & \cdots & J_{mn} \end{bmatrix}$$

(4): creating a magnetic potential matrix 4.1): calculating a magnetic potential for each pixel of the thermal reference image according to the following equation:

$$A_{ij} = \frac{I\mu_0}{4\pi} \int_C \frac{dl}{R_{ij}}$$

where I is the current in the coil, $\mu_0$ is the permeability of air, C is the closed path along the coil, dl is the vector length element along the coil, $R_{ij}$ is the distance from the coil to the pixel of row i and column j of the specimen;

4.2): creating a magnetic potential matrix A:

$$A = \begin{bmatrix} A_{11} & A_{12} & \ldots & A_{1n} \\ A_{21} & A_{22} & \ldots & A_{2n} \\ \vdots & & A_{ij} & \vdots \\ A_{m1} & A_{m2} & \ldots & A_{mn} \end{bmatrix}$$

(5): calculating the electric potential and conductivity for each pixel of the thermal reference image according to the electrical impedance tomography 5.1): inputting initial conductivity matrix $\sigma^1$, angular frequency $\omega$ and iteration termination criteria $\varepsilon$, and initializing iteration number k=1;

5.2): for iteration k, calculating an electric potential matrix $\hat{U}^k$ by traversing all pixels of the thermal reference image, where the electric potential $U^k_{i,j}$ of row i and column j satisfies the following equation:

$$a_{i,j}U^k_{i,j+1} + b_{i,j}U^k_{i-1,j} + c_{i,j}U^k_{i,j-1} + d_{i,j}U^k_{i+1,j} + e_{i,j}U^k_{i,j} = f_{i,j}$$

where parameters $a_{i,j}$, $b_{i,j}$, $c_{i,j}$, $d_{i,j}$, $e_{i,j}$, $f_{i,j}$ satisfy the following equation:

$$a_{i,j} = \frac{2\sigma^k_{i,j}\sigma^k_{i,j+1}}{\sigma^k_{i,j} + \sigma^k_{i,j+1}} \quad b_{i,j} = \frac{2\sigma^k_{i,j}\sigma^k_{i-1,j}}{\sigma^k_{i,j} + \sigma^k_{i-1,j}} \quad c_{i,j} = \frac{2\sigma^c_{i,j}\sigma^k_{i,j-1}}{\sigma^k_{i,j}\sigma^k_{i,j-1}}$$

$$d_{i,j} = \frac{2\sigma^k_{i,j}\sigma^k_{i+1,j}}{\sigma^k_{i,j} + \sigma^k_{i+1,j}} \quad e_{i,j} = -(a_{i,j} + b_{i,j} + c_{i,j} + d_{i,j})$$

$$f_{i,j} = -\omega\sigma^k_{i,j}A_{i,j} \times \left(\frac{\sigma^k_{i,j+1} - \sigma^k_{i,j}}{\sigma^k_{i,j+1} + \sigma^k_{i,j}} + \frac{\sigma^k_{i,j} - \sigma^k_{i-1,j}}{\sigma^k_{i,j} + \sigma^k_{i-1,j}} + \frac{\sigma^k_{i,j} - \sigma^k_{i,j-1}}{\sigma^k_{i,j} + \sigma^k_{i,j-1}} + \frac{\sigma^k_{i+1,j} - \sigma^k_{i,j}}{\sigma^k_{i+1,j} - \sigma^k_{i,j}}\right),$$

then creating the following matrix form:

$$G \cdot U^k = C$$

where $U^k$ is a electric potential vector, which is created by choosing electric potentials $U^k_{i,j}$ from left to right and top to bottom, and putting them from top to bottom:

$$U^k = \begin{bmatrix} \vdots \\ U^k_{i-1,j} \\ \vdots \\ U^k_{i,j-1} \\ U^k_{i,j} \\ U^k_{i,j+1} \\ \vdots \\ U^k_{i+1,j} \\ \vdots \end{bmatrix}$$

parameter matrix G is composed of parameters $a_{i,j}$, $b_{i,j}$, $c_{i,j}$, $d_{i,j}$, $e_{i,j}$;

$$G = \begin{bmatrix} 0 & \ldots & b_{i,j-1} & 0 & \ldots & 0 & c_{i,j-1} & e_{i,j-1} & a_{i,j-1} & 0 & \ldots & 0 & d_{i,j-1} & 0 & \ldots & & \ldots & 0 \\ 0 & \ldots & 0 & b_{i,j} & 0 & \ldots & 0 & c_{i,j} & e_{i,j} & a_{i,j} & 0 & \ldots & 0 & d_{i,j} & 0 & \ldots & 0 \\ 0 & \ldots & & \ldots & 0 & b_{i,j+1} & 0 & \ldots & 0 & c_{i,j+1} & e_{i,j+1} & a_{i,j+1} & 0 & \ldots & 0 & d_{i,j+1} & \ldots & 0 \end{bmatrix}$$

vector C is composed of parameter $f_{i,j}$:

$$C = \begin{bmatrix} \vdots \\ f_{i-1,j} \\ \vdots \\ f_{i,j-1} \\ f_{i,j} \\ f_{i,j+1} \\ \vdots \\ f_{i+1,j} \\ \vdots \end{bmatrix}$$

then calculating electric potential vector $U^k$ according to the following equation:

$$U^k = G^{-1} \cdot C$$

then choosing the electric potentials of electric potential vector $U^k$ from top to bottom, and putting them from left to right and top to bottom to create electric potential matrix $\hat{U}^k$:

$$\hat{U}_k = \begin{bmatrix} U^k_{11} & U^k_{12} & \ldots & U^k_{1n} \\ U^k_{21} & U^k_{22} & \ldots & U^k_{2n} \\ \vdots & & U^k_{ij} & \vdots \\ U^k_{m1} & U^k_{m2} & \ldots & U^k_{mn} \end{bmatrix}$$

5.3): calculating electric field intensity matrix $E^k$ of the $k^{th}$ iteration, where electric field intensity $E^k_{i,j}$ of row i and column j satisfies the following equation:

$$E^k_{ij} = \sqrt{E^{k2}_{xij} + E^{k2}_{yij}}$$

$$E^k_{xij} = \frac{\sigma^k_{ij+1}}{\sigma^k_{ij+1} + \sigma^k_{ij}}(U^k_{ij+1} - U^k_{ij} - \omega A_{ij}) + \frac{\sigma^k_{ij-1}}{\sigma^k_{ij-1} + \sigma^k_{ij}}(U^k_{ij} - U^k_{ij-1} - \omega A_{ij})$$

$$E^k_{yij} = \frac{\sigma^k_{i+1j}}{\sigma^k_{i+1j}\sigma^k_{ij}}(U^k_{i+1j} - U^k_{ij} - \omega A_{ij}) + \frac{\sigma^k_{i-1j}}{\sigma^k_{i-1j} + \sigma^k_{ij}}(U^k_{ij} - U^k_{i-1j} - \omega A_{ij})$$

electric field intensity matrix $E^k$ is:

$$E^k = \begin{bmatrix} E^k_{11} & E^k_{12} & \ldots & E^k_{1n} \\ E^k_{21} & E^k_{22} & \ldots & E^k_{2n} \\ \vdots & & E^k_{ij} & \vdots \\ E^k_{m1} & E^k_{m2} & \ldots & E^k_{mn} \end{bmatrix}$$

5.4): calculating the conductivity matrix $\sigma^{k+1}$ after the $k^{th}$ iteration, where conductivity matrix $\sigma^{k+1}$ is:

$$\sigma^{k+1} = \begin{bmatrix} \sigma_{11}^{k+1} & \sigma_{12}^{k+1} & \cdots & \sigma_{1n}^{k+1} \\ \sigma_{21}^{k+1} & \sigma_{22}^{k+1} & \cdots & \sigma_{2n}^{k+1} \\ \vdots & \sigma_{ij}^{k+1} & & \vdots \\ \sigma_{m1}^{k+1} & \sigma_{m2}^{k+1} & \cdots & \sigma_{mn}^{k+1} \end{bmatrix}$$

where conductivity $\sigma^{k+1}{}_{ij}$ of row i and column j is:

$$\sigma_{ij}^{k+1} = \frac{J_{ij}}{E_{ij}^k}$$

5.5): judging whether the infinite norm $\|\sigma_{k+1} - \sigma_k\|_\infty$ is less than iteration termination criteria $\varepsilon$, if not, then adding 1 to iteration number k and returning to step 5.2) to continue iterating, otherwise, going to step (6);

(6): outputting conductivity matrix $\sigma^{k+1}$, and taking it as a reconstructed image, then taking the low conductivity area of the reconstructed image as the defect profile.

The objectives of the present invention are realized as follows:

In the present invention, method for eddy current thermography defect reconstruction based on electrical impedance tomography, first, obtaining a thermal reference image of temperature change with time by acquiring a thermogram sequence S of the specimen in the process of heating and fitting a curve for pixels of each location of the thermogram sequence S, then, creating a current matrix and a magnetic potential matrix, and calculating the satisfied conductivity distribution through iterations, so as a reconstructed image is obtained, then taking the low conductivity area of the reconstructed image as the defect profile, thus the defect profile is identified.

Meanwhile, the present invention also has the following advantages:

(1): By calculating a current image (creating a current matrix) from a thermogram sequence and reconstructing a conductivity image (conductivity matrix), the conversion from thermogram to conductivity image is realized, thus the eddy current thermography defect reconstruction is realized, which can quantify a defect;

(2): Comparing to the method for eddy current thermography based on blind source separation, which is proposed by Newcastle University of Great Britain, the present invention not only can identify defect, but also can reconstruct the defect profile to quantify the defect.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment

Figure 1:
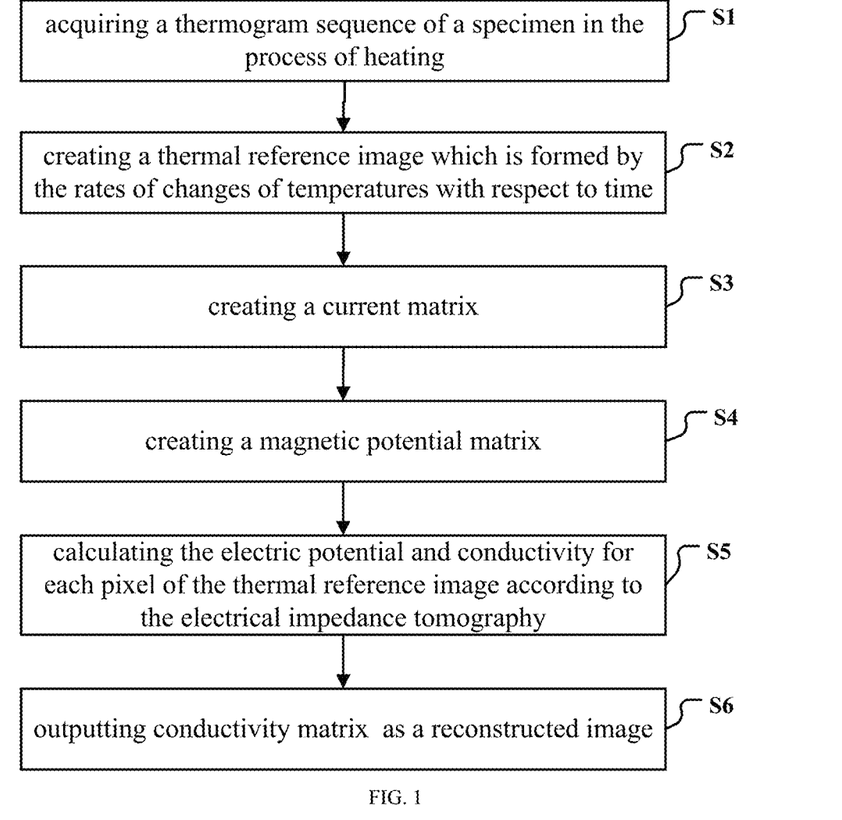
FIG. 1 is a flow diagram of a method for method for eddy current thermography defect reconstruction based on electrical impedance tomography in accordance with the present invention.

FIG. 1 is a flow diagram of a method for method for eddy current thermography defect reconstruction based on electrical impedance tomography in accordance with the present invention.

In one embodiment, As shown in FIG. 1, a method for method for eddy current thermography defect reconstruction based on electrical impedance tomography is provided, which comprises the following steps:

Step S1: acquiring a thermogram sequence of a specimen in the process of heating Powering on a coil, and then using the coil to excite a specimen under test, then an induced eddy current will be generated in the specimen under test, meanwhile, in the process of heating, using an infrared camera to acquire a thermogram sequence of the specimen, which is denoted by thermogram sequence S, where each frame of image of thermogram sequence S is m*n.

Figure 2:
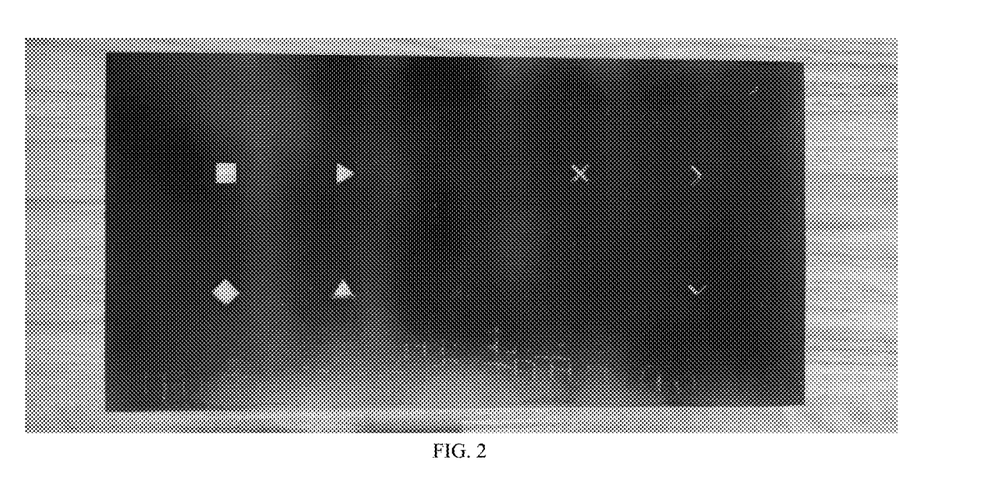
FIG. 2 is an illustration of a specimen under test.

In the embodiment, a high conductivity hollow copper tube with internal diameter 6.35 mm is taken as the coil. The frequency and amplitude of the current inputted in the coil are 275 kHz and 150 A. The specimen is a piece of stainless steel with thickness of 0.28 mm. The type of the stainless steel is austenitic 304. As shown in FIG. 2, defects of various profiles are carved on the specimen. The coil is horizontally placed above the specimen with lift-off distance of 1 cm. When the current is inputted into the coil, the heating starts. The heating time is 200 ms. In process of heating, an infrared camera is used to acquire a thermogram sequence of the specimen, which is denoted by thermogram sequence S, where each frame of image of thermogram sequence S is m*n, m=100, n=100.

Step S2: creating a thermal reference image which is formed by the rates of changes of temperatures with respect to time For each location of thermogram sequence S, putting the pixels there together according to time to fit a temperature-time curve, then choosing the slope of the second point of the temperature-time curve as a rate of change of temperature with respect to time, which is denoted by $$\frac{\partial T_{ij}}{\partial t},$$

where $T_{ij}$ is the pixel value of at the second point, row i and column j represent its location, t is the time at the second point, then creating a thermal reference image by taking $$\frac{\partial T_{ij}}{\partial t}$$

as a pixel, where i=1, 2, . . . , m, j=1, 2, . . . , n.

Step S3: creating a current matrix

Step S3.1: In the thermal reference image, for each pixel of the specimen under test, the rate of change of temperature with respect to time satisfies with heat conduction equation, so we can calculate a current amplitude for each pixel of the thermal reference image according to the following heat conduction equation:

$$\frac{\partial T_{ij}}{\partial t} = \frac{(J_{ij})^2}{\sigma^* \rho C}$$

where $J_{ij}$ is the current amplitude of row i and column j, i=1, 2, ..., m, j=1, 2, ..., n, $\sigma^*$ is the conductivity of the specimen, $\rho$ is the density of the specimen, C is the specific heat capacity of the specimen. In the embodiment, $\sigma^*=1.37\times 10^6$ S/m, $\rho=7.93$ g/cm$^3$, C=0.5KJ·kg$^{-1}$K$^{-1}$.

Step S3.2: through calculating the current amplitude of each pixel, we can create a current matrix J:

$$J = \begin{bmatrix} J_{11} & J_{12} & \ldots & J_{1n} \\ J_{21} & J_{22} & \ldots & J_{2n} \\ \vdots & \vdots & \vdots & \vdots \\ \vdots & \vdots & J_{ij} & \vdots \\ J_{m1} & J_{m2} & \ldots & J_{mn} \end{bmatrix}$$

Figure 3:
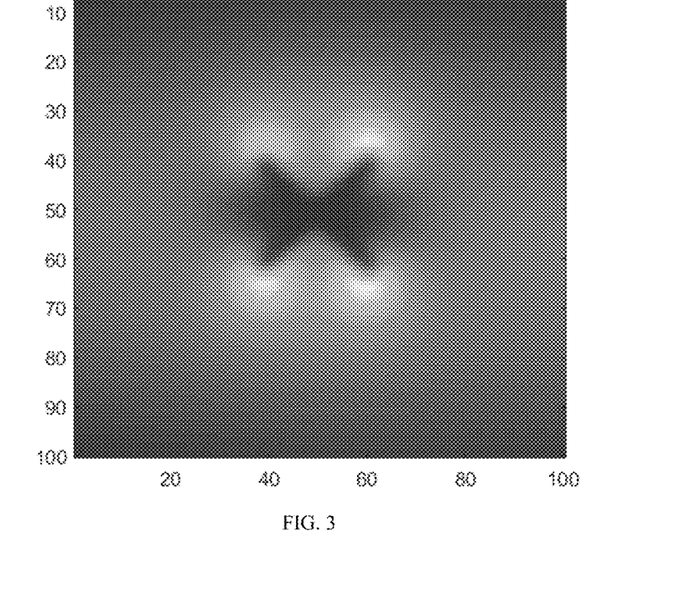
FIG. 3 is a current image of a defect shown in FIG. 2 in accordance with the present invention.

A current image formed by current matrix J is shown in FIG. 3. For the coil is placed horizontally, eddy current namely the induced eddy current flows horizontally on the surface of the specimen. When the induced eddy current encounter a defect, it will move around the defect, and congregate at the upper end and the lower end of the defect. So in the current image, the current at the upper end and the lower end of the defect is higher than that at the middle area of the defect.

Step S4: creating a magnetic potential matrix

Step S4.1: calculating a magnetic potential for each pixel of the thermal reference image according to the following equation:

$$A_{ij} = \frac{I\mu_0}{4\pi}\int_C \frac{dl}{R_{ij}}$$

where I is the current in the coil, $\mu_0$ is the permeability of air, $\mu_0=4\pi\times 10^{-7}$ H/m, C is the closed path along the coil, dl is the vector length element along the coil, $R_{ij}$ is the distance from the coil to the pixel of row i and column j of the specimen.

Step S4.2: through calculating the magnetic potential of each pixel, we can create a magnetic potential matrix A:

$$A = \begin{bmatrix} A_{11} & A_{12} & \ldots & A_{1n} \\ A_{21} & A_{22} & \ldots & A_{2n} \\ \vdots & & A_{ij} & \vdots \\ A_{m1} & A_{m2} & \ldots & A_{mn} \end{bmatrix}$$

Step S5: calculating the electric potential and conductivity for each pixel of the thermal reference image according to the electrical impedance tomography Step S5.1: inputting initial conductivity matrix $\sigma^1$, angular frequency $\omega$ and iteration termination criteria $\varepsilon$, and initializing iteration number k=1. In the embodiment, every element of initial conductivity matrix $\sigma^1$ is 1, angular frequency $\omega=1.73\times 10^6$ rad/s, iteration termination criteria $\varepsilon=0.1$.

Figure 4:
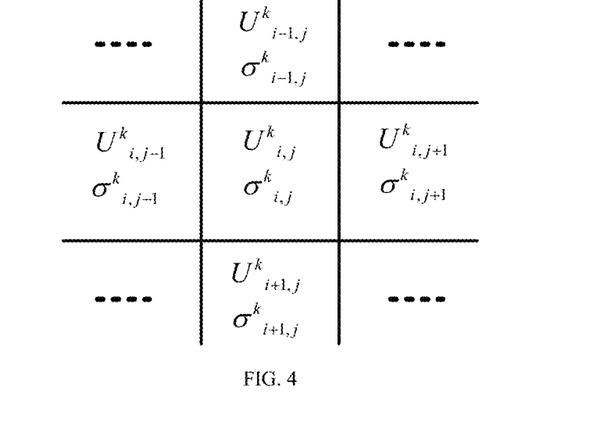
FIG. 4 is a diagram of a two-dimensional grid in accordance with the present invention.

Step S5.2: for iteration k, calculating an electric potential matrix $\hat{U}^k$ by traversing all pixels of the thermal reference image. In the embodiment, the specimen can be taken as a two-dimensional grid with size of m*n. Each grid represents a pixel. As shown FIG. 4, the pixels of the two-dimensional grid are electric potentials, where the electric potential $U^k_{i,j}$ of row i and column j satisfies the following equation:

$$a_{i,j}U^k_{i,j+1} + b_{i,j}U^k_{i-1,j} + c_{i,j}U^k_{i,j-1} + d_{i,j}U^k_{i+1,j} + e_{i,j}U^k_{i,j} = f_{i,j}$$

where parameters $a_{i,j}$, $b_{i,j}$, $c_{i,j}$, $d_{i,j}$, $e_{i,j}$, $f_{i,j}$ satisfy the following equation:

$$a_{i,j} = \frac{2\sigma^k_{i,j}\sigma^k_{i,j+1}}{\sigma^k_{i,j}+\sigma^k_{i,j+1}} \quad b_{i,j} = \frac{2\sigma^k_{i,j}\sigma^k_{i-1,j}}{\sigma^k_{i,j}+\sigma^k_{i-1,j}} \quad c_{i,j} = \frac{2\sigma^k_{i,j}\sigma^k_{i,j-1}}{\sigma^k_{i,j}+\sigma^k_{i,j-1}}$$

$$d_{i,j} = \frac{2\sigma^k_{i,j}\sigma^k_{i+1,j}}{\sigma^k_{i,j}+\sigma^k_{i+1,j}} \quad e_{i,j} = -(a_{i,j}+b_{i,j}+c_{i,j}+d_{i,j})$$

$$f_{i,j} = -\omega\sigma^k_{i,j}A_{i,j}\times\left(\frac{\sigma^k_{i,j+1}-\sigma^k_{i,j}}{\sigma^k_{i,j+1}+\sigma^k_{i,j}} + \frac{\sigma^k_{i,j}-\sigma^k_{i-1,j}}{\sigma^k_{i,j}+\sigma^k_{i-1,j}} + \frac{\sigma^k_{i,j}-\sigma^k_{i,j-1}}{\sigma^k_{i,j}+\sigma^k_{i,j-1}} + \frac{\sigma^k_{i+1,j}-\sigma^k_{i,j}}{\sigma^k_{i+1,j}-\sigma^k_{i,j}}\right)$$

By combining the equations of all pixels, we can create the following matrix form:

$$G \cdot U^k = C$$

where $U^k$ is a electric potential vector, which is created by choosing electric potentials $U^k_{i,j}$ from left to right and top to bottom, and putting them from top to bottom:

$$U^k = \begin{bmatrix} \vdots \\ U^k_{i-1,j} \\ \vdots \\ U^k_{1,j-1} \\ U^k_{i,j} \\ U^k_{i,j+1} \\ \vdots \\ U^k_{i+1,j} \\ \vdots \end{bmatrix}$$

Parameter matrix G is composed of parameters $a_{i,j}$, $b_{i,j}$, $c_{i,j}$, $d_{i,j}$, $e_{i,j}$:

$$G = \begin{bmatrix} 0 & \ldots & b_{i,j-1} & 0 & \ldots & 0 & c_{i,j-1} & e_{i,j-1} & a_{i,j-1} & 0 & \ldots & 0 & d_{i,j-1} & 0 & \ldots & & \ldots & 0 \\ 0 & \ldots & 0 & b_{i,j} & 0 & \ldots & 0 & c_{i,j} & e_{i,j} & a_{i,j} & 0 & \ldots & 0 & d_{i,j} & & 0 & \ldots & 0 \\ 0 & \ldots & & \ldots & 0 & b_{i,j+1} & 0 & \ldots & 0 & c_{i,j+1} & e_{i,j+1} & a_{i,j+1} & 0 & \ldots & 0 & d_{i,j+1} & \ldots & 0 \end{bmatrix}$$

Vector C is composed of parameter $f_{i,j}$:

$$C = \begin{bmatrix} \vdots \\ f_{i-1,j} \\ \vdots \\ f_{i,j-1} \\ f_{i,j} \\ f_{i,j+1} \\ \vdots \\ f_{i+1,j} \\ \vdots \end{bmatrix}$$

So we can calculate electric potential vector $U^k$ according to the following equation:

$$U^k = G^{-1} \cdot C$$

The electric potentials of electric potential vector $U^k$ from top to bottom are chosen, and put them from left to right and top to bottom to create electric potential matrix $\hat{U}^k$:

$$\hat{U}^k = \begin{bmatrix} U^k_{11} & U^k_{12} & \ldots & U^k_{1n} \\ U^k_{21} & U^k_{22} & \ldots & U^k_{2n} \\ \vdots & & U^k_{ij} & & \vdots \\ U^k_{m1} & U^k_{m2} & \ldots & U^k_{mn} \end{bmatrix}$$

Step S5.3: calculating electric field intensity matrix $E^k$ of the $k^{th}$ iteration, where electric field intensity $E^k_{i,j}$ of row i and column j satisfies the following equation:

$$E^k_{ij} = \sqrt{E^{k2}_{xij} + E^{k2}_{yij}}$$

$$E^k_{xij} = \frac{\sigma^k_{ij+1}}{\sigma^k_{ij+1}+\sigma^k_{ij}}(U^k_{ij+1} - U^k_{ij} - \omega A_{ij}) + \frac{\sigma^k_{ij-1}}{\sigma^k_{ij-1}+\sigma^k_{ij}}(U^k_{ij} - U^k_{ij-1} - \omega A_{ij})$$

$$E^k_{yij} = \frac{\sigma^k_{i+1j}}{\sigma^k_{i+1j}+\sigma^k_{ij}}(U^k_{i+1j} - U^k_{ij} - \omega A_{ij}) + \frac{\sigma^k_{i-1j}}{\sigma^k_{i-1j}+\sigma^k_{ij}}(U^k_{ij} - U^k_{i-1j} - U^k_{i-1j} - \omega A_{ij})$$

Electric field intensity matrix $E^k$ is:

$$E^k = \begin{bmatrix} E^k_{11} & E^k_{12} & \ldots & E^k_{1n} \\ E^k_{21} & E^k_{22} & \ldots & E^k_{2n} \\ \vdots & & E^k_{ij} & & \vdots \\ E^k_{m1} & E^k_{m2} & \ldots & E^k_{mn} \end{bmatrix}$$

Step S5.4: calculating the conductivity matrix $\sigma^{k+1}$ after the $k^{th}$ iteration, where conductivity matrix $\sigma^{k+1}$ is:

$$\sigma^{k+1} = \begin{bmatrix} \sigma^{k+1}_{11} & \sigma^{k+1}_{12} & \ldots & \sigma^{k+1}_{1n} \\ \sigma^{k+1}_{21} & \sigma^{k+1}_{22} & \ldots & \sigma^{k+1}_{2n} \\ \vdots & & \sigma^{k+1}_{ij} & & \vdots \\ \sigma^{k+1}_{m1} & \sigma^{k+1}_{m2} & \ldots & \sigma^{k+1}_{mn} \end{bmatrix}$$

where conductivity $\sigma^{k+1}_{ij}$ of row i and column j is:

$$\sigma^{k+1}_{ij} = \frac{J_{ij}}{E^k_{ij}}$$

Step S5.5: judging whether the infinite norm $\|\sigma_{k+1}-\sigma_k\|_\infty$ is less than iteration termination criteria ε, if not, then adding 1 to iteration number k and returning to step S5.2) to continue iterating, otherwise, going to step S6.

Step S6: outputting conductivity matrix $\sigma^{k+1}$ as a reconstructed image

Figure 5:
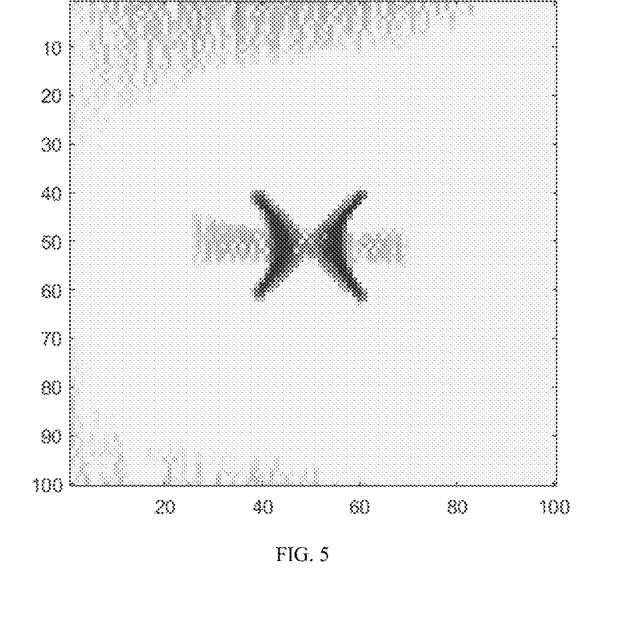
FIG. 5 is an illustration of a reconstructed image in accordance with the present invention.

Outputting conductivity matrix $\sigma^{k+1}$, and taking it as a reconstructed image, then taking the low conductivity area of the reconstructed image as the defect profile. As shown in FIG. 5, despite the some noise exist in the reconstructed image, the identification of defect profile is not affected.

While illustrative embodiments of the invention have been described above, it is, of course, understand that various modifications will be apparent to those of ordinary skill in the art. Such modifications are within the spirit and scope of the invention, which is limited and defined only by the appended claims

What is claimed is:

1. A method for eddy current thermography defect reconstruction based on electrical impedance tomography, comprising:
   (1): powering on a coil, and then using the coil to excite a specimen under test (hereinafter referred to as specimen), then an induced eddy current will be generated in the specimen, meanwhile, in the process of heating, using an infrared camera to acquire a thermogram sequence of the specimen, which is denoted by thermogram sequence S, where each frame of image of thermogram sequence S is m*n;
   (2): for each location of thermogram sequence S, putting pixels there according to time to fit a temperature-time curve, then choosing a slope of a second point of the temperature-time curve as a rate of change of temperature with respect to time, which is denoted by $$\frac{\partial T_{ij}}{\partial t},$$

where $T_{ij}$ is the pixel value at the second point, row i and column j represent its location, t is the time at the second point, then creating a thermal reference image by taking $$\frac{\partial T_{ij}}{\partial t}$$

as a pixel, where i=1, 2, ..., m, j=1, 2, ..., n;

(3): creating a current matrix by:

3.1) calculating a current amplitude for each pixel of the thermal reference image according to the following heat conduction equation:

$$\frac{\partial T_{ij}}{\partial t} = \frac{(J_{ij})^2}{\sigma^* \rho C}$$

where $J_{ij}$ is a current amplitude of row i and column j, i=1, 2, ..., m, j=1, 2, ..., n, $\sigma^*$ is a conductivity of the specimen, $\rho$ is a density of the specimen, C is a specific heat capacity of the specimen;

3.2): creating a current matrix J:

$$J = \begin{bmatrix} J_{11} & J_{12} & \cdots & J_{1n} \\ J_{21} & J_{22} & \cdots & J_{2n} \\ \vdots & \vdots & \vdots & \vdots \\ \vdots & \vdots & J_{ij} & \vdots \\ J_{m1} & J_{m2} & \cdots & J_{mn} \end{bmatrix}$$

(4): creating a magnetic potential matrix by:

4.1): calculating a magnetic potential for each pixel of the thermal reference image according to the following equation:

$$A_{ij} = \frac{I\mu_0}{4\pi} \int_C \frac{dl}{R_{ij}}$$

where I is a current in the coil, $\mu_0$ is a permeability of air, C is a closed path along the coil, dl is a vector length element along the coil, $R_{ij}$ is a distance from the coil to the pixel of row i and column j of the specimen;

4.2): creating a magnetic potential matrix A:

$$A = \begin{bmatrix} A_{11} & A_{12} & \cdots & A_{1n} \\ A_{21} & A_{22} & \cdots & A_{2n} \\ \vdots & & A_{ij} & \vdots \\ A_{m1} & A_{m2} & \cdots & A_{mn} \end{bmatrix}$$

(5): calculating the electric potential and conductivity for each pixel of the thermal reference image according to the electrical impedance tomography by:

5.1): inputting initial conductivity matrix $\sigma^1$, angular frequency $\omega$ and iteration termination criteria $\varepsilon$, and initializing iteration number k=1;

5.2): for iteration k, calculating an electric potential matrix $\hat{U}^k$ by traversing all pixels of the thermal reference image, where the electric potential $U^k_{i,j}$ of row i and column j satisfies the following equation:

$$a_{i,j}U^k_{i,j+1} + b_{i,j}U^k_{i-1,j} + c_{i,j}U^k_{i,j-1} + d_{i,j}U^k_{i+1,j} + e_{i,j}U^k_{i,j} = f_{i,j}$$

where parameters $a_{i,j}$, $b_{i,j}$, $c_{i,j}$, $d_{i,j}$, $e_{i,j}$, $f_{i,j}$ satisfy the following equation:

$$a_{i,j} = \frac{2\sigma^k_{i,j}\sigma^k_{i,j+1}}{\sigma^k_{i,j} + \sigma^k_{i,j+1}} \quad b_{i,j} = \frac{2\sigma^k_{i,j}\sigma^k_{i-1,j}}{\sigma^k_{i,j} + \sigma^k_{i-1,j}} \quad c_{i,j} = \frac{2\sigma^k_{i,j}\sigma^k_{i,j-1}}{\sigma^k_{i,j} + \sigma^k_{i,j-1}} \quad d_{i,j} = \frac{2\sigma^k_{i,j}\sigma^k_{i+1,j}}{\sigma^k_{i,j} + \sigma^k_{i+1,j}}$$

$$e_{i,j} = -(a_{i,j} + b_{i,j} + c_{i,j} + d_{i,j})$$

$$f_{i,j} = -\omega\sigma^k_{i,j}A_{i,j} \times \left( \frac{\sigma^k_{i,j+1} - \sigma^k_{i,j}}{\sigma^k_{i,j+1} + \sigma^k_{i,j}} + \frac{\sigma^k_{i,j} - \sigma^k_{i-1,j}}{\sigma^k_{i,j} + \sigma^k_{i-1,j}} + \frac{\sigma^k_{i,j} - \sigma^k_{i,j-1}}{\sigma^k_{i,j} + \sigma^k_{i,j-1}} + \frac{\sigma^k_{i+1,j} - \sigma^k_{i,j}}{\sigma^k_{i+1,j} - \sigma^k_{i,j}} \right);$$

then creating the following matrix form:

$$G \cdot U^k = C$$

where $U^k$ is a electric potential vector, which is created by choosing electric potentials $U^k_{i,j}$ from left to right and top to bottom, and putting them from top to bottom:

$$U^k = \begin{bmatrix} \vdots \\ U^k_{i-1,j} \\ \vdots \\ U^k_{i,j-1} \\ U^k_{i,j} \\ U^k_{i,j+1} \\ \vdots \\ U^k_{i+1,j} \\ \vdots \end{bmatrix}$$

where parameter matrix G is composed of parameters $a_{i,j}$, $b_{i,j}$, $c_{i,j}$, $d_{i,j}$, $e_{i,j}$:

$$G = \begin{bmatrix} 0 & \cdots & b_{i,j-1} & 0 & \cdots & 0 & c_{i,j-1} & e_{i,j-1} & a_{i,j-1} & 0 & \cdots & 0 & d_{i,j-1} & 0 & \cdots & \cdots & 0 \\ 0 & \cdots & 0 & b_{i,j} & 0 & \cdots & 0 & c_{i,j} & e_{i,j} & a_{i,j} & 0 & \cdots & 0 & d_{i,j} & 0 & \cdots & 0 \\ 0 & \cdots & & \cdots & 0 & b_{i,j+1} & 0 & \cdots & 0 & c_{i,j+1} & e_{i,j+1} & a_{i,j+1} & 0 & \cdots & 0 & d_{i,j+1} & \cdots & 0 \end{bmatrix}$$

where vector C is composed of parameter $f_{i,j}$:

$$C = \begin{bmatrix} \vdots \\ f_{i-1,j} \\ \vdots \\ f_{i,j-1} \\ f_{i,j} \\ f_{i,j+1} \\ \vdots \\ f_{i+1,j} \\ \vdots \end{bmatrix}$$

then calculating electric potential vector $U^k$ according to the following equation:

$$U^k = G^{-1} \cdot C$$

then choosing the electric potentials of electric potential vector $U^k$ from top to bottom, and putting them from left to right and top to bottom to create electric potential matrix $\hat{U}^k$:

$$\hat{U}^k = \begin{bmatrix} U_{11}^k & U_{12}^k & \cdots & U_{1n}^k \\ U_{21}^k & U_{22}^k & \cdots & U_{2n}^k \\ \vdots & & U_{ij}^k & \vdots \\ U_{m1}^k & U_{m2}^k & \cdots & U_{mn}^k \end{bmatrix}$$

5.3): calculating electric field intensity matrix $E^k$ of the $k^{th}$ iteration, where electric field intensity $E^k_{i,j}$ of row i and column j satisfies the following equation:

$$E_{ij}^k = \sqrt{E_{xij}^{k2} + E_{yij}^{k2}})$$

$$E_{xij}^k = \frac{\sigma_{ij+1}^k}{\sigma_{ij+1}^k + \sigma_{ij}^k}\left(U_{ij+1}^k - U_{ij}^k - \omega A_{ij}\right) + \frac{\sigma_{ij-1}^k}{\sigma_{ij-1}^k + \sigma_{ij}^k}\left(U_{ij}^k - U_{ij-1}^k - \omega A_{ij}\right)$$

$$E_{yij}^k = \frac{\sigma_{i+1j}^k}{\sigma_{i+1j}^k + \sigma_{ij}^k}\left(U_{i+1j}^k - U_{ij}^k - \omega A_{ij}\right) + \frac{\sigma_{i-1j}^k}{\sigma_{i-1j}^k + \sigma_{ij}^k}\left(U_{ij}^k - U_{i-1j}^k - \omega A_{ij}\right)$$

where electric field intensity matrix $E^k$ is:

$$E^k = \begin{bmatrix} E_{11}^k & E_{12}^k & \cdots & E_{1n}^k \\ E_{21}^k & E_{22}^k & \cdots & E_{2n}^k \\ \vdots & & E_{ij}^k & \vdots \\ E_{m1}^k & E_{m2}^k & \cdots & E_{mn}^k \end{bmatrix}$$

5.4): calculating the conductivity matrix $\sigma^{k+1}$ after the $k^{th}$ iteration, where conductivity matrix $\sigma^{k+1}$ is:

$$\sigma^{k+1} = \begin{bmatrix} \sigma_{11}^{k+1} & \sigma_{12}^{k+1} & \cdots & \sigma_{1n}^{k+1} \\ \sigma_{21}^{k+1} & \sigma_{22}^{k+1} & \cdots & \sigma_{2n}^{k+1} \\ \vdots & & \sigma_{ij}^{k+1} & \vdots \\ \sigma_{m1}^{k+1} & \sigma_{m2}^{k+1} & \cdots & \sigma_{mn}^{k+1} \end{bmatrix}$$

where conductivity $\sigma^{k+1}_{ij}$ of row i and column j is:

$$\sigma_{ij}^{k+1} = \frac{J_{ij}}{E_{ij}^k}$$

5.5): judging whether the infinite norm $\|\sigma_{k+1} - \sigma_k\|_\infty$ is less than iteration termination criteria $\varepsilon$, if not, then adding 1 to iteration number k and returning to step 5.2) to continue iterating, otherwise, going to step (6);

(6): outputting conductivity matrix $\sigma^{k+1}$, and taking it as a reconstructed image, then taking the low conductivity area of the reconstructed image as the defect profile.

\* \* \* \* \*